(12) United States Patent
Baccouche et al.

(10) Patent No.: US 8,602,454 B1
(45) Date of Patent: Dec. 10, 2013

(54) CRASH LOAD MANAGEMENT IN AUTOMOTIVE VEHICLES USING CLOSED LOOP STRUCTURES

(75) Inventors: Mohamed Ridha Baccouche, Ann Arbor, MI (US); Saied Nusier, Canton, MI (US); James Chih Cheng, Troy, MI (US); Rahul Arora, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/607,866

(22) Filed: Sep. 10, 2012

(51) Int. Cl.
*B62D 21/02* (2006.01)
*B62D 21/15* (2006.01)
*B60K 1/04* (2006.01)

(52) U.S. Cl.
USPC ...... 280/781; 280/784; 296/203.01; 296/204; 180/68.5

(58) Field of Classification Search
CPC ...... B62D 21/02; B62D 21/15; B62D 21/152; B62D 21/157
USPC ........ 280/781, 784; 296/187.03, 203.01, 204, 296/193.07; 180/68.5, 311
See application file for complete search history.

(56) References Cited

U.S. PATENT DOCUMENTS

| | | | |
|---|---|---|---|
| 910,206 A * | 1/1909 | Golembiewski | 280/13 |
| 1,475,331 A * | 11/1923 | Wales | 280/790 |
| 1,694,215 A * | 12/1928 | Golembiewski | 280/13 |
| 2,741,486 A * | 4/1956 | Torgrimson | 280/13 |
| 3,108,836 A * | 10/1963 | Deckert | 296/204 |
| 3,653,677 A * | 4/1972 | Feser | 280/8 |
| 3,791,472 A * | 2/1974 | Tatsumi | 180/312 |
| 3,874,683 A * | 4/1975 | Lawson | 280/10 |
| 3,972,308 A * | 8/1976 | Ray | 119/60 |
| 4,216,839 A * | 8/1980 | Gould et al. | 180/65.1 |
| 5,048,888 A * | 9/1991 | Willy et al. | 296/187.03 |
| 5,908,077 A * | 6/1999 | Moore | 180/65.25 |
| 6,179,372 B1 * | 1/2001 | Sakamoto et al. | 296/203.02 |
| 7,000,318 B2 * | 2/2006 | Chernoff et al. | 29/897.2 |
| 7,025,412 B2 * | 4/2006 | Nakamura et al. | 296/193.07 |
| 7,422,272 B2 * | 9/2008 | Horton et al. | 296/205 |
| 7,469,957 B1 * | 12/2008 | Boettcher | 296/193.07 |
| 7,556,113 B2 * | 7/2009 | Amori et al. | 180/68.5 |
| 8,439,430 B2 * | 5/2013 | Sato et al. | 296/203.02 |
| 2005/0082876 A1 * | 4/2005 | Akasaka | 296/203.01 |
| 2009/0146462 A1 * | 6/2009 | Sato et al. | 296/203.03 |
| 2009/0229333 A1 * | 9/2009 | Jensen et al. | 72/60 |
| 2011/0049855 A1 * | 3/2011 | Karube et al. | 280/798 |
| 2011/0083923 A1 * | 4/2011 | Ajisaka | 180/291 |
| 2012/0212009 A1 * | 8/2012 | Ishizono et al. | 296/193.07 |
| 2012/0251862 A1 * | 10/2012 | Kano et al. | 429/99 |
| 2012/0256446 A1 * | 10/2012 | Yasuhara et al. | 296/193.07 |
| 2012/0274100 A1 * | 11/2012 | Mildner et al. | 296/193.07 |

* cited by examiner

*Primary Examiner* — Joseph Rocca
(74) *Attorney, Agent, or Firm* — Joseph E. Root

(57) ABSTRACT

An underbody structure in a vehicle includes a front rail configured to take a crash load and form a load path during a frontal impact. At least one arcuate beam is connected at one end of the front rail and is coupled at another end to at least one of a left structural member and a right structural member of the underbody structure. Here, the left and the right structural members are fixedly connected to a side structure of the vehicle, and the arcuate beam is angularly connected to the left and the right structural member. The angular connection is configured to transfer the crash load, at least partially, during the frontal impact to the at least one of the left structural member and the right structural member.

16 Claims, 4 Drawing Sheets

CRASH LOAD MANAGEMENT IN AUTOMOTIVE VEHICLES USING CLOSED LOOP STRUCTURES

BACKGROUND

The present disclosure generally relates to crash load management in vehicles, and, more particularly, to structures that provide a load travel path to a frontal crash load, minimizing floor deformations and thereby improving vehicular safety.

Structural integrity and stiffness of a vehicular underbody form fundamental factors to the vehicle's crash worthiness. Conventional vehicles, driven on internal combustion engines, include underbody structures that have at least one longitudinal beam, referred to as a sled runner, which generally extend all the way to the rear of the vehicle, providing a load travel path during a frontal impact. With the introduction of PHEVs (plug-in hybrid electric vehicles) and HEVs (hybrid electric vehicles), the underbody structure in application today has undergone changes in the overall shape and design. Such changes in the conventional design result from the incorporation of battery packs in PHEVs and HEVs, which are commonly stored within the vehicle's underbody structure. In particular, storage of battery packs causes the employed sled runners to be cut short, almost by half of their conventional length, leading to disruptions in a crash load's travel path, thus resulting in excessive vehicular floor deformations during a crash. This, thereby, limits the mandated crash safety scores, as well.

Typically, the size of the sheet metal employed to make the floor or the underbody of the vehicle is roughly 0.65 to 0.7 mm in thickness. With the sled runners being cut considerably short when accommodating the battery packs, a latter or a rear portion of the floor remains exposed to the crash load from the force experienced by the vehicle during a frontal impact. During a frontal crash, the incoming crash load travels beyond the sled runners, distributing itself into the minimally thick floor, resulting in excessive floor deformations caused by the inappropriate force travel path. In short, the floor being minimally thick does not sustain the crash load.

Thus, there remains a need to attain an improved crash load path in PHEVs and HEVs that can manage crash loads sufficiently enough to avoid excessive deformation to the vehicular underbody.

SUMMARY

One embodiment of the present disclosure describes an underbody structure in a vehicle. The underbody structure includes a front rail configured to take a crash load and form a load path during a frontal impact on the vehicle. At least one arcuate beam is connected at one end of the front rail and is coupled at another end to at least one of a left structural member and a right structural member of the vehicle's underbody structure. Here, the at least one of the left structural member and the right structural member is fixedly connected to a side structure of the vehicle, while the at least one arcuate beam is angularly connected to the at least one of the left structural member and the right structural member. More particularly, the angular connection is configured to transfer the crash load, at least partially, during the frontal impact to the at least one of the left structural member and the right structural member.

Another embodiment of the present disclosure describes a mechanism positioned within a vehicle's underbody structure. The mechanism transfers a crash load during a frontal impact on the vehicle and includes a front rail configured to take the crash load and form a load path during the frontal impact. Further, the mechanism includes a left structural member and a right structural member, which are fixedly attached to a left side structure and a right side structure of the vehicle, respectively. Furthermore, a first hydro formed loop structure and a second hydro formed loop structure is positioned within the underbody structure with each of the hydro formed loop structure including an arcuate beam angularly connected to the respective left structural member, and the right structural member. In particular, the angular connection of the arcuate beam deflects the crash load during the frontal impact, at least partially, towards the respective left and the right structural member. In addition, the mechanism includes a beam oriented substantially along the length of the vehicle and a beam oriented substantially along the width of the vehicle configured to absorb and transfer a substantial amount of a side crash load experienced during a side impact. Here, the arcuate beam, the beam along the vehicle's width and the beam along the length of the vehicle are connected to each other to form the hydro formed loop structure.

Certain embodiments of the present disclosure describe a method to transfer a frontal crash load during a frontal impact to at least one rocker arm of an underbody structure in a vehicle. The method includes providing at least one sled runner, which is connected at one end to a front rail to form a load path, where the front rail is configured to take a crash load. In particular, the sled runner is adapted to be angularly connected to at least one of a left rocker arm and a right rocker arm of the vehicle's underbody structure. Here, the at least one of the left rocker arm and the right rocker arm is fixedly connected to a side structure of the vehicle. More specifically, the angular connection of the sled runner is configured to transfer the crash load at least partially during the frontal impact on the vehicle to the at least one of the left rocker arm and the right rocker arm. Furthermore, the method provides at least one sled runner oriented substantially along the length of the vehicle, and at least one beam oriented substantially along the width of the vehicle. In further detail, the sled runner, connected at one end to the front rail, the beam along the vehicle's width and the sled runner along the vehicle's length are connected to each other to form a loop structure. Moreover, the loop structure includes storage portions for components disposed within the underbody structure, wherein the sled runner oriented substantially along the length of the vehicle and the beam oriented substantially along the vehicle's width are configured to provide attachment regions for mounting the components to the underbody structure.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and mechanisms, incorporated into underbody structures of HEVs or PHEVs, for enabling a frontal crash load to travel along an appropriate crash load path, eventually enhancing vehicular safety during a frontal impact. To this end, a conventional beam is modified and formed into an arcuate beam, connecting a front rail of the vehicle to the vehicle's rocker arm, thereby forming a new path for the load's travel. The modified beam has an arcuate portion and a straight portion, and thus this beam is referred to as a "sled runner" throughout this text. Moreover, the sled runner and a set of beams along the vehicle's width and the vehicle's length are connected to form a closed loop, all providing attachment regions to a vehicular battery pack and storage of the battery chargers.

Exemplary Embodiments

Conventionally observed frontal vehicular crashes involve the transfer of crash loads up to the order of 30000 pounds. With such a huge amount of needed load transfer, it is desirable for vehicles to have mechanisms in place to counter the force experienced during a crash. As noted above, the currently applied PHEVs (plug-in hybrid electric vehicles) and HEVs (hybrid electric vehicles) lack adequate mechanisms to counter such crashes. Accordingly, this disclosure proposes a mechanism to limit excessive underbody deformations during a crash.

Figure 1:
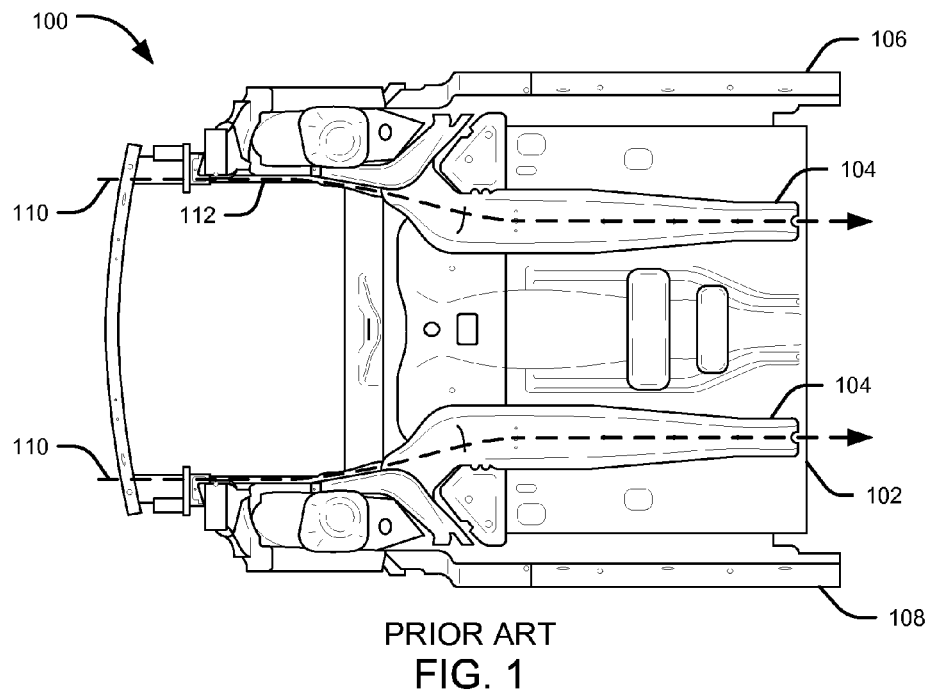
FIG. 1 is a bottom view of an exemplary conventional underbody structure of a vehicle powered by an internal combustion engine.

Turning to FIG. 1, a conventional underbody 100 of a vehicle, powered by a conventional internal combustion engine, will now be described. The underbody 100 includes a substantially planer configuration in relation to a vehicle's travel surface, and is configured to include channels, sections for wiring, passages for exhaust, etc., within the vehicle's floor. Apart from such sections, a segment referred to as a sled runner 104 is included, which enables a crash load, experienced during a frontal crash, to travel along the underbody's length. Commonly employed configurations of the underbody 100 include at least two such sled runners 104, as shown. Further, the underbody 100 includes a floor pan 102, forming substantially the entire planer section of the underbody 100, and thus the vehicle floor. Furthermore, the underbody 100 includes a front rail 112, forming one part of the front section of the underbody 100, and therefore, of the vehicle as well. Fixed to a left side structure and a right side structure of the underbody 100 is a left structural member, referred to as a left rocker arm 108, and a right structural member, referred to as a right rocker arm 106, respectively. The rocker arms 108 and 106, in general, prevent the underbody structure from deformations during impacts.

In such conventional vehicles, typically, the floor pan 102 is obtained through a press forming operation on a sheet metal. Thereafter, well known operations, such as stamping, shearing, and final assembly, are carried out to obtain a finished underbody structure.

The sled runners 104 are longitudinal segments formed within the underbody 100, as shown. On several occasions, the sled runners 104 may be integrally configured within the underbody 100 during the generic sheet metal operations, while on other occasions the sled runners 104 may be adapted to be fitted externally via spot welding procedures. Many underbody configurations currently existing include the sled runners 104 in varied numbers, configurations, and orientations, depending upon safety requirements and manufacturing specifications. As noted above, the sled runners 104 are primarily configured to form and provide a crash load path to a load experienced during a frontal crash, and this travel path can be understood through load travel curves 110, depicting exemplary load paths extending from the front rail 112 all the way to the rear of the vehicle.

The front rail 112, as known in conventional art, extends all the way, almost to the vehicle's front section, and is disposed substantially between the vehicle's engine and the vehicle's bumper (not shown). The front rail 112 conventionally comprises an inner and outer rail member, having a boxed and substantially C-shaped cross-section, which mates with each other to form the front rail 112. More particularly, the front rail 112 absorbs and dissipates substantial amounts of energy during frontal impacts. In order to enable a sequential deformation of the front rail 112 during a frontal impact, the front rail 112 is usually provided with twisted sections, generally referred to as convolutions, formed all along the inner and outer rail members. The convolutions are spaced relatively along the length of the front rail 112. Such convolutions enable sequential deformation of the front rail 112, starting from the front end, and progressing rearwards towards an engine cross-rail (not shown). Structurally, the front rail 112 is included in almost all kinds of vehicles, irrespective of the body styles, such as monocoque, unitary, or body-on-frame construction types. Moreover, the front rail 112 provides sections for positioning the vehicle's wheels, suspension, and other pre-requisite structural attachments required for normal vehicular operations. At the rear end, the front rail 112 connects to the sled runners 104, the connection forming an integral structure, and thereby forming the crash load path.

Vehicles, such as electric vehicles, require more improved energy absorption characteristics than conventional vehicular requirements, particularly because of an increase in the vehicle's weight. This is because hybrid electric vehicles require batteries for frequently switching between the alternate vehicular operation modes, causing an increase in the components employed within the vehicle's assembly, and therefore requiring increased energy dissipation requirements due to the increased weight.

Accordingly, referring to FIG. 2, an exemplary conventional underbody structure of a HEV, referred to as a conventional HEV underbody 200, will now be described. Similar to the underbody 100, the HEV underbody 200 includes a front rail 208 disposed in a similar configuration as the front rail 112, described above. In contrast to the design of the underbody 100 however, the HEV underbody 200 includes a considerably different overall plan and layout. The HEV underbody 200 includes a battery packaging space 206, which in turn is disposed within the underbody 200 in a "plus configuration", as shown. In particular, the battery packaging space 206 includes recessive sections for accommodating at least one battery pack (not shown), that aid in the hybrid operations while forming an alternate energy source to the internal combustions engine. More specifically, a conventionally applied battery pack may include a series of batteries positioned next to each other, mounted along a transversal as well as a front-to-rear configuration within the underbody 200. The assemblage and attachment of the battery packs to the HEV underbody 200 are enabled from the vehicle's bottom through welds or threaded fasteners, once the HEV underbody 200 is formed. With details and other configurations of the battery pack and its assemblage being well known to the skilled in the art, its further details will not be discussed more.

More to the structure of the HEV underbody 200, are structural members, namely, a left structural member, referred to as a left rocker arm 212 and a right structural member, referred to as a right rocker arm 210, both being fixedly attached to a left side structure 211 and a right side structure 209 of the HEV underbody 200, respectively. Particularly, the left side structure 211 and the right side structure 209 of the HEV underbody 200 may be inner rocker arms, which may be connected to the rocker arms 210 and 212 via a flanged connection.

A set of sled runners 204, referred specifically to as mid sled runner 204a, tunnel sled runner 204b, and front sled runner 204c, is incorporated within the HEV underbody 200, as shown. The set of sled runners 204 carries out the task of safeguarding the vehicle from a crash by providing a load path for a frontal impact, and thus preventing excessive damage to the HEV underbody 200. The sled runners 204, however, stopping in length approximately midway along the HEV underbody 200, as shown, are observed to be generally incapable of protecting the underbody 200 from excessive deformations.

More explicitly, a crash load travelling from the front rail 208 all the way through the sled runners 204 experiences an inappropriate load path upon travelling beyond the sled runners 204. The crash load thus, upon travelling further, distributes itself into a HEV floor pan 202, similar to the floor pan 102, which in turn is usually incapable of sustaining such crash loads from causing excessive deformations. This may be further understood through a set of load travel curves 214, which depict the load travel path of an exemplary frontal crash. In brief, the sled runners 204 stopping almost midway to the underbody 200 causes the load travel curves 214 to stop approximately midway as well.

Furthermore, the HEV floor pan 202 being made of a sheet metal with minimal thickness remains susceptible and exposed to such damages. Moreover, ratings such the ones obtained through New Car Assessment Programme (NCAP)/Offset Deformable Barrier (ODB), and the like, are affected when excessive deformations are observed at the vehicle's underbody, causing market depreciation of the product.

Figure 3:
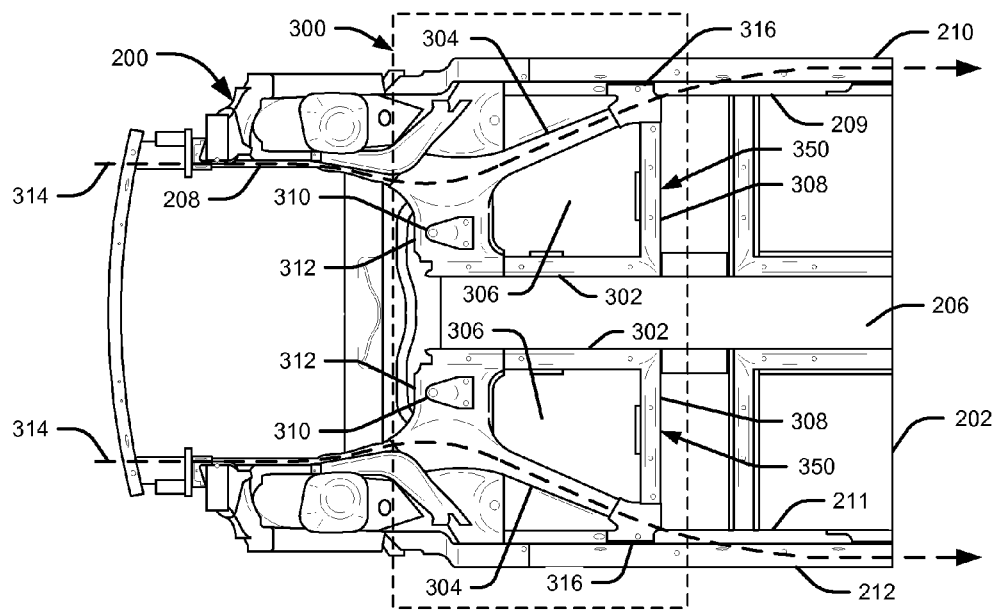
FIG. 3 is a bottom view of an exemplary underbody structure of a HEV or PHEV according to the aspects of the present disclosure.

As shown in FIG. 3, this disclosure thus provides a mechanism 300 disposed and positioned within the underbody 200 of the vehicle, in place of the sled runners 204. In general, the mechanism 300 may be referred to as a modified form of the sled runners 204 as well. The mechanism 300 is adapted to include provisions for transferring a crash load during a frontal impact on the vehicle, providing the incoming load with a more appropriate load travel path. Moreover, the transfer of the crash load is understood to be deflected towards a region or towards a structural member having a configuration to absorb and direct the incoming load away from the floor pan 202, enabling the floor pan 202 to remain sufficiently protected during the crash. To accomplish this, the mechanism 300 includes structurally configured members, which are hereby disclosed below.

Accordingly, and more specifically, the mechanism 300 includes a first loop structure and a second loop structure, collectively referred to as closed loops 350, which are positioned within the HEV underbody 200, as depicted. In detail, each of the closed loops 350 are plainly disposed on the floor pan 202. The closed loops 350 include an arcuate beam, collectively referred to as the arcuate beams 304, which are connected at one end of the front rail 208 and angularly connected or coupled to the respective left rocker arm 212 and the right rocker arm 210 via brackets 316, as shown. The angular connection of the arcuate beams 304 is configured to deflect or transfer an incoming crash load during a frontal impact at least partially towards the respective left rocker arm 212 and/or the right rocker arm 210.

Figure 4:
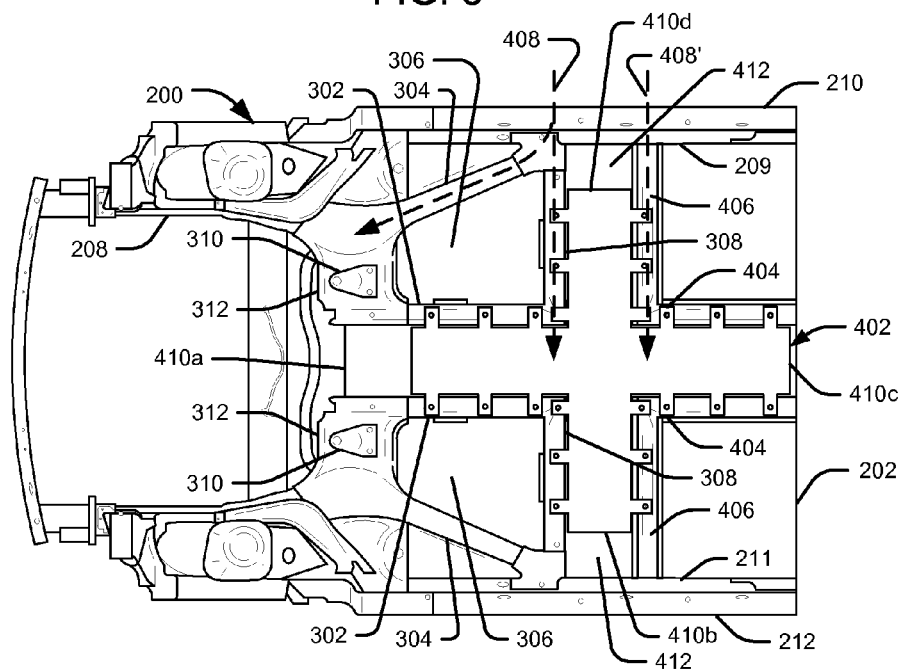
FIG. 4 depicts embodiments to the underbody structure of FIG. 3, according to the aspects of the present disclosure.

Structurally, each of the closed loops 350 includes at least one beam 302 oriented substantially along the length of the vehicle, and at least one beam 308 oriented substantially along the width of the vehicle. Here, both the beams 302 and 308 are configured to absorb and transfer a substantial amount of a side crash load experienced during a side impact as well. Moreover, while in application, the arcuate beams 304 and the beams 302 may simply be referred to as sled runners as well. More particularly, it is the inclusion and disposal of the arcuate beams 304 and the beams 308 along the width of the vehicle that may help sustain a side crash load experienced during a side impact as well. Side load travel curves 408 and 408', which are depicted in FIG. 4 for clarity purposes, envision one such exemplary side impact load path, enabled through the mechanism 300, with the curve 408 travelling all the way to an in-vehicular back-up rail bracket 312 (discussed later). Embodiments are included that enable provisions of a cross member 704 (shown in FIG. 7) as well that structurally extends from the left rocker arm 212 to the right rocker arm 210, covering requirements in relation to Insurance Institute for Highway Safety (IIHS) mandates for side load travel, experienced during side impacts. In addition, it is understood that the orientation of the beams 302 may enable a partial absorption of load resulting from a frontal crash as well.

In both of the closed loops 350, it can be noted that the arcuate beams 304, the beams 308 along the vehicle's width, and the beams 302 along the vehicle's length, are connected to each other to form the closed loops 350. Such a connection may be accomplished via fastening methods well known in the art, or via unitary construction of closed loops 350.

The back-up rail bracket 312, in particular, connects the front rail 208 to the closed loops 350, thereby forming a continued pathway or a load path for an incoming crash load. A sub-frame assembly (not shown), brought from under the vehicle, may accordingly be mounted and assembled to the HEV underbody 200, through a sub-frame mounting bracket 310 disposed on the back-up rail bracket 312. This also implies that a frontal crash load may travel to the floor pan 202, at least partially, through the mounting bracket 310 as well.

It is understood that the front rail 208 also forms an integral part of the mechanism 300 disclosed above, and is thus configured to take a crash load, forming one portion of load path during frontal impacts as well. With the disclosed mechanism 300, a load experienced during a frontal crash may take an alternate path in relation to conventionally observed load paths. The load path experienced according to the aspects of the present disclosure can thus be understood through the illustrated load travel curves 314, which extends all the way to the rear of the HEV underbody 200, and thus to the rear of the vehicle as well.

Figure 2:
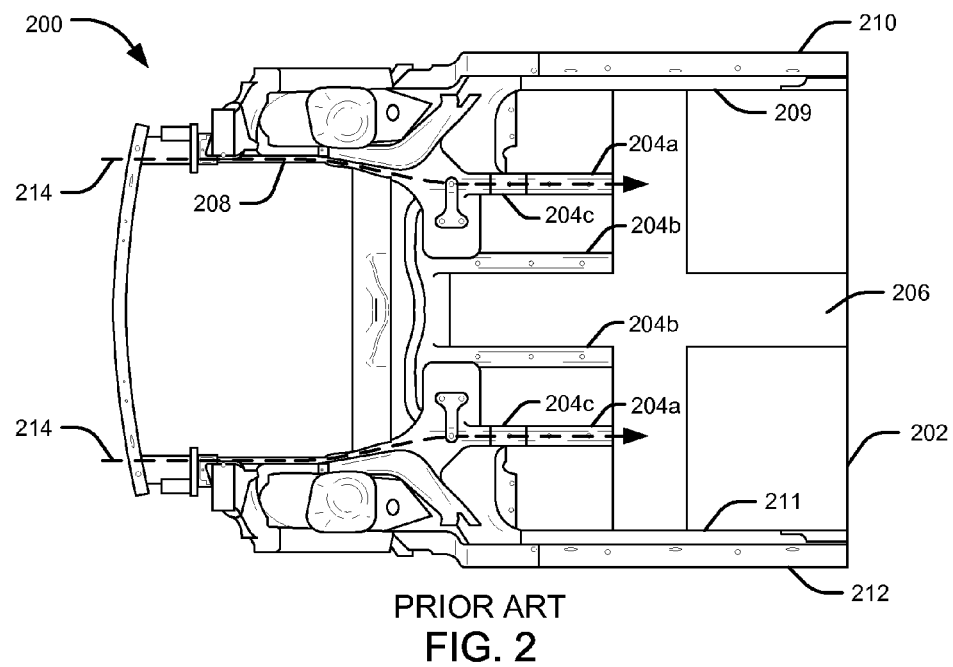
FIG. 2 is a bottom view of an exemplary conventional underbody structure of a HEV or PHEV.

Conventionally, materials used to form the sled runners 204, depicted in FIG. 2, include high strength steel or high strength aluminum based materials or alloys. The closed loops 350, being a modified form of the sled runners 204, depicted in FIG. 2, may be produced from such materials as well. Manufacturing procedures for the closed loops 350 may include forming processes such as forging, extrusion, vacuum forming, rolling, etc., which are well known to the skilled in the art.

Of the known forming processes however, a hydro-forming procedure has been experimentally found to be the most favorable process to manufacture the closed loops 350. This is because hydroforming is similar to the conventional deep-drawing technique, but has significant advantages for the formed part, and keeps the tooling costs and hence the production costs low. More specifically, hydroforming includes the application of a uniform force to the sheet metal, with a fluid shaping the sheet metal into the form of the related core. In this process, a uniform distribution of sheet thicknesses is achieved, which allows for maximum degrees of deformation. With a factor that ensures high dimensional accuracy, abrupt changes in stress dispersed over the sheet metal is avoided, thereby reducing the tendency of the material to return to its original size and shape when the applied load is removed. Therefore an expected spring-back affect in sheet metal is avoided, and a better degree of deformation for the formed part is achieved. Furthermore, with the preferable requirement for each of the closed loops 350 to be an integrated structure for maintaining structural rigidity, hydroforming procedures help in forming such relatively complicated shapes, which are unitary in construction. The closed loops 350 thus form a first hydro formed loop structure and a second hydro formed loop structure.

In embodiments where the closed loops 350 include the beams 308, disposed along the vehicle's width, and the beams 302, disposed along the vehicle's length, to be produced separately and assembled thereafter, manufacturing processes other than hydro-forming can be used. Fastening of the beams 302 and 308 in relation to each other to form the closed loops 350, in such cases, may be enabled via threaded fasteners, or through other fastening techniques well known in the art, such as through industrial adhesives or welding.

With the incorporation of the mechanism 300, an advantage to the overall weight of the vehicle is also achieved. The description below includes a tabulation (Table 1), stating exemplarily, the calculated weight of the components employed in the conventional HEV underbody 200, when produced through a well-known grade of steel.

TABLE 1

| Part (One Side) | Material | Thickness (mm) | Weight (lbs) |
| --- | --- | --- | --- |
| AL Front Sled Runner 204c | Steel | 2.9 | 5.50 |
| AL Mid Sled Runner 204a | Steel | 2.3 | 2.86 |
| AL Tunnel Sled Runner 204b | Steel | 1.8 | 2.96 |
| Total Steel weight of conventional sled runners | | | 11.32 |

Through the calculation of the weight of the hydro formed closed loop 350, it is experimentally observed that the closed loop 350 weighs about 50% less than the weight of the components utilized in the conventional HEV underbody 200, when produced through similar materials. When produced through well-known lightweight materials, the closed loop 350 is observed to weigh about 70% less than the components employed for the conventional HEV underbody 200. It can thus be noted that, apart from providing a much needed load path, the mechanism 300 provides overall weight savings as well.

Referring in further detail to FIG. 4, another advantage of the mechanism 300 is disclosed. Accordingly, the mechanism 300, and, more particularly, the closed loops 350 provide attachment regions and storage portions for mounting components disposed and positioned within the underbody structure. Here, the components include at least one battery and at least one battery charger (not shown). Correspondingly, a battery carrier 402, disposed in the recessive sections of the floor pan 202, allows a front-to-rear and a transversal packaging of the battery packs in relation to the HEV underbody 200. Therefore, the battery carrier 402 includes battery storage arms, namely, 410a, 410b, 410c, and 410d, which make right angles to each other forming a "plus configuration" for battery storage. The "plus configuration" may be understood for an appropriate accommodation within the recessive sections of the floor pan 202. Further, the arm 410b and 410d, disposed transversally along the vehicle's width, provide for empty sections 412 on either side as shown. This is in order to accommodate for a load experienced during a side impact. More particularly, the beams 302 disposed along the length and the beams 308 disposed along the width of the vehicle provide attachment regions 406 for mounting of the battery carrier 402 to the HEV underbody 200 as well. Joint brackets 404, disposed all over the arms of the battery carrier 402 extend out forming attachment measures for mounting the battery carrier 402 to the closed loops 350. The battery carrier 402 may thus be attached to the HEV underbody 200 through such attachment measures, enabling the storage of battery packs. Moreover, the closed loops 350 enable the storage of at least one battery charger as well. To accomplish this, region 306 may be used. The closed loops 350, still including unutilized attachment sections, may capitalize on the storage of the battery charger as well. Such storage means being well known in the art will not be discussed further in the application.

Figure 7:
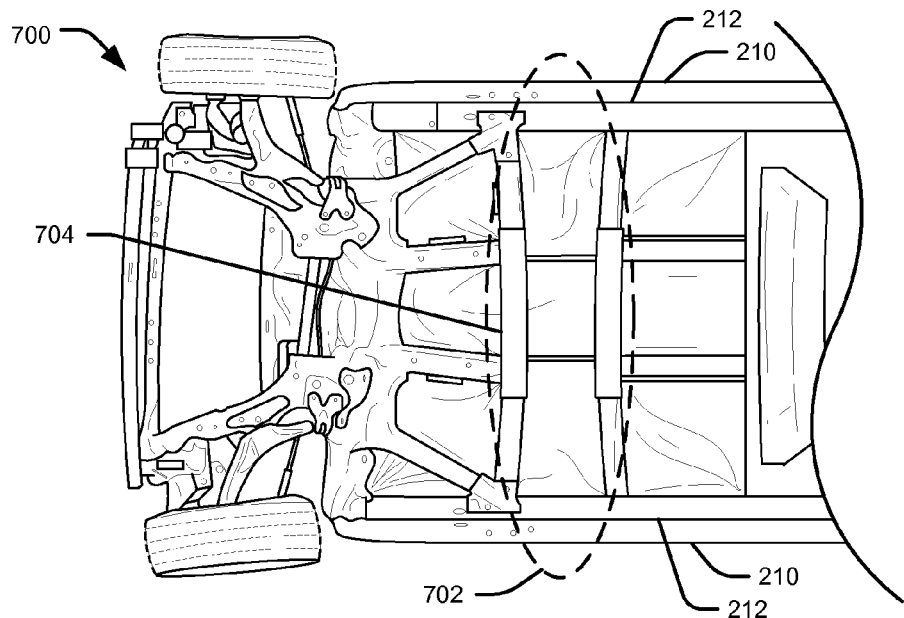
FIG. 7 is a bottom view of an underbody structure of a HEV or PHEV, according to the aspects of the present disclosure, after an exemplary crash

Advantageously, the mechanism 300 enables an enhancement and stiffness of the joints and bends of the recessive sections or, more particularly, the packaging space 206, disposed within the floor pan 202 as well. Here, the stiffness enhancement is enabled through the incorporation of the mechanism 300 to the HEV underbody 200 that connects the rocker arms 210 and 212, through the cross member 704 as shown in FIG. 7.

Figure 5:
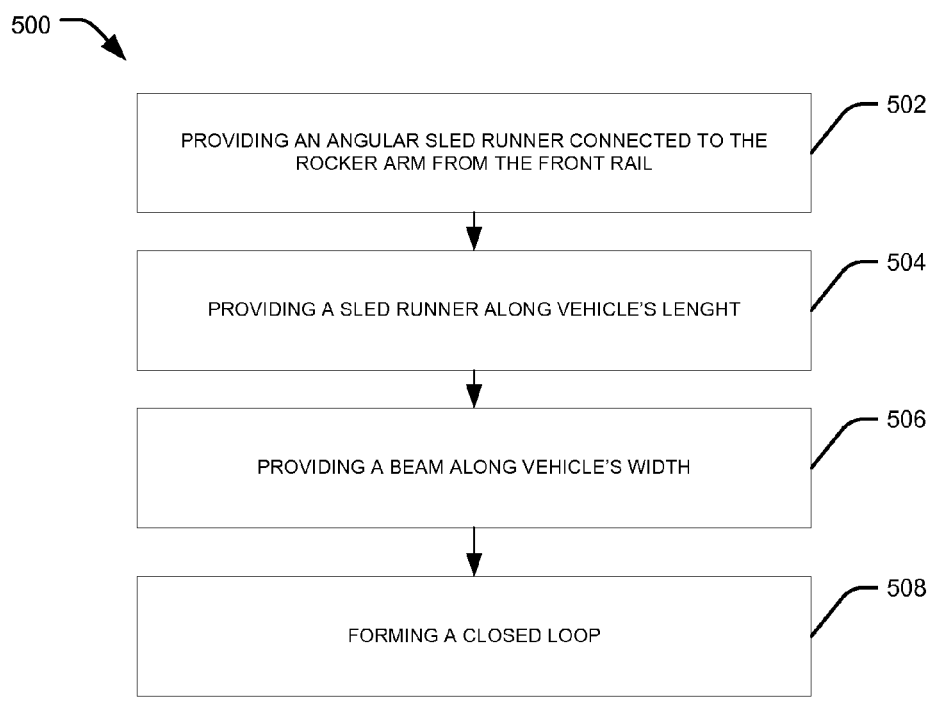
FIG. 5 is a flowchart depicting an exemplary methodology of the aspects of the present disclosure.

The mechanism 300 set out above is further explained through a method 500 via a flowchart in FIG. 5. It is understood that the discussion for the method 500 will remain similar and co-relate to the aspects of the disclosure discussed above.

Accordingly, at a first stage 502, the method 500 provides at least one angular sled runner, referred to as the arcuate beams 304, which connects to the front rail 208 at one of its end, and to the at least one of the rocker arms 212 and 210, at its other end. At stage 504, the method 500 provides for at least one beam 302, along the vehicle's length, and at stage 506, the method 500 provides at least one beam 308 along the vehicle's width. The method 500 finally, at stage 508, provides for the connections between the beams 308, beams 302, and the arcuate beams 304, forming the closed loops 350, where the mechanism 300, as a whole, is set to include the closed loops 350, the front rail 208, and the rocker arms 210 and 212.

While in an application, the front rail 208 experiences a frontal crash load. The front rail 208, including multiple convolutions, allows a sequential deformation of the front rail 208 upon the impact's progress into the vehicle. As the crash load travels further, the HEV underbody 200, along with the other frontal vehicular components collapse. Travelling beyond the frontal section, the back-up rail bracket 312 and the at least one closed loop 350 provides a continued load path to the incoming crash load via the at least one arcuate beam 304. In particular, the arcuate beam 304 transfers the crash load to either of the rocker arms 210 and 212, thus protecting the underbody 200 from excessive deformations. Moreover, the cabin space and the battery storage region, referred to as the packaging space 206, remains protected from considerable damage during the crash as well.

Figure 6:
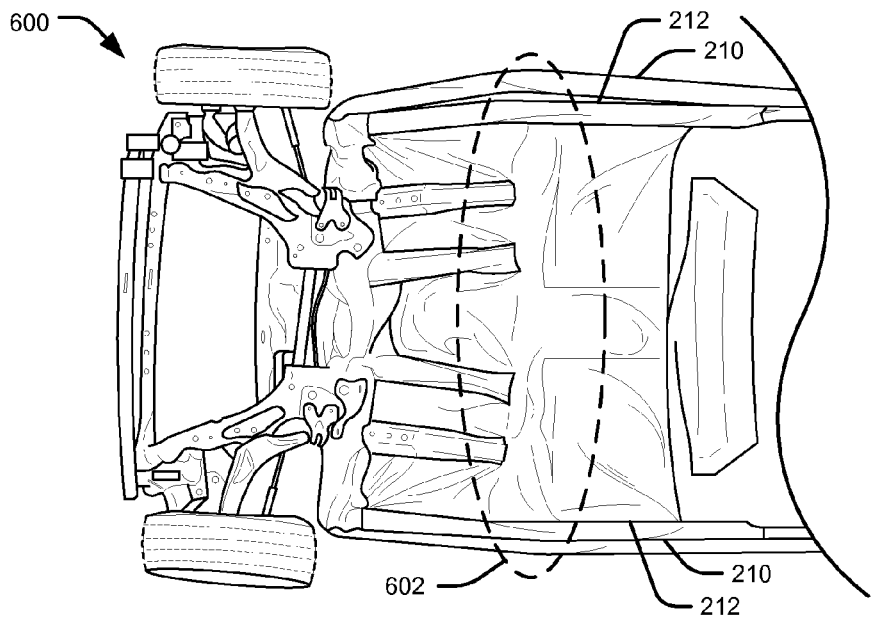
FIG. 6 is a bottom view of an underbody structure of a conventional HEV or PHEV after an exemplary crash.

Turning now to FIG. 6 and FIG. 7, exemplary states of two HEV underbodies are disclosed, which were obtained after exemplary crash testing experiments, with the one depicted in FIG. 6 to be a conventional HEV underbody 600, while the one in FIG. 7 to be a HEV underbody 700 that is installed with the mechanism 300. It is understood that the depictions are exemplary in nature and may differ from real life crash incidents. The illustrations depicted however in the two figures intend to focus on the differences observed between underbody deformations observed in the two experimental cases. It may also be understood that the illustrations provided are closest to the actual state of the underbodies observed during the experiments.

It may thus be noted that a crash experienced by a vehicle having the conventional HEV underbody 600 suffered damages to the packaging space 206 depicted by the region 602 to a degree that could have damaged the battery pack beyond repair and re-use. More particularly, in certain scenarios, such damage may have possibly resulted in vehicular fires, chemical leakage, and explosions as well. Moreover, the vehicle's cabin space is observed to have been intruded by the crash load, which could have endangered the lives of the passengers travelling in the vehicle during an actual crash event. In contrast, the HEV underbody 700, performing much better in the crash experiments, managed well to safeguard the battery storage region 702, as shown in FIG. 7, by considerably protecting the battery packaging space 206 from major deformations, and in effect, and understandably protecting the vehicular cabin as well.

It is understood that the type of crash disclosed in the application includes the crash tested under federally mandated standard test conditions, such as NCAP/ODB crash modes. More specifically, the figures depicted in FIGS. 6 and 7 are of the full frontal rigid barrier 35 mph test. Further, experiments have proved that the mechanism 300 meets the latest crash test mandate set to be followed in the United States of America, namely the SORB (Small Offset Rigid Barrier) test.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed disclosure is defined solely by the claims set out below.

We claim:

1. An underbody structure for a vehicle, the underbody structure comprising:
   a front rail configured to take a crash load and form a load path during a frontal impact on the vehicle;
   at least one arcuate beam having a first end connected to the front rail, and a second end attached to a side structural member of the vehicle;
   a first beam oriented substantially along the length of the vehicle and a second beam oriented substantially along the width of the vehicle, wherein a first end of the first beam is directly connected to a first end of the second beam, a second end of the first beam is connected to the arcuate beam, and a second end of the second beam is directly connected to the arcuate beam, to form a closed loop structure, and wherein, the arcuate beam is angularly positioned between the front rail and the side structural member, configured to at least partially transfer crash loads during the frontal impact, from the front portion to the side structure of the vehicle.

2. The underbody structure of claim 1, wherein the second beam oriented along the width of the vehicle is configured to absorb and transfer a substantial amount of a side crash load experienced during a side impact.

3. The underbody structure of claim 1, wherein the loop structure is configured to provide storage portions for components disposed within the vehicle's underbody structure.

4. The underbody structure of claim 3, wherein the components include at least one of a vehicular battery and a vehicular battery charger.

5. The underbody structure of claim 1, further comprising at least one back-up rail bracket connecting the structure to the front rail, and forming a continuous load path.

6. The underbody structure of claim 5, wherein a sub-frame assembly is mounted to the underbody structure through at least one mounting bracket disposed on the back-up rail bracket.

7. The underbody structure of claim 1, wherein the loop structure is hydro formed.

8. The underbody structure of claim 1, wherein the left and the right structural members are rocker arms configured to prevent the underbody structure from deformations during impacts.

9. A mechanism positioned within a vehicle's underbody structure, the mechanism being configured to transfer a crash load during a frontal impact on the vehicle, the mechanism comprising:
   a front rail configured to take the crash load and form a load path during the frontal impact;
   a left structural member and a right structural member, each being fixedly attached to a left side structure and a right side structure of the vehicle, respectively; and
   a first hydro-formed loop structure and a second hydro-formed loop structure, positioned within the underbody structure; wherein, each of the loop structures includes:
   an arcuate beam angularly connected to one of the left and the right structural members, the angular connection of the arcuate beam being configured to deflect the crash load during the frontal impact, at least partially, towards a respective of the left and the right structural member;
   a first beam oriented substantially along the length of the vehicle; and
   a second beam oriented substantially along the width of the vehicle and configured to absorb and transfer at least a portion of a side crash load experienced during a side impact; wherein a first end of the first beam is directly connected to a first end of the second beam, a second end of the first beam is connected to the arcuate beam, and a second end of the second beam is directly connected to the arcuate beam, the first beam, the second beam, and the arcuate beam together forming the hydro-formed loop structure.

10. The mechanism of claim 9, wherein the hydro formed loop structures are configured to provide storage portions for components disposed within the underbody structure, wherein the beam oriented substantially along the length of the vehicle and the beam oriented substantially along the width of the vehicle are configured to provide attachment regions for mounting the components to the underbody structure, the components including at least one of a vehicular battery and a vehicular battery charger.

11. The mechanism of claim 9 further comprising a back-up rail bracket connecting the hydro formed loop structure and the front rail, the back-up rail bracket forming a continued load path.

12. The mechanism of claim 9, wherein both the left structural member and the right structural member of the underbody structure are rocker arms configured to prevent the underbody structure from deformations during impacts.

13. A method for distributing a frontal crash load within an underbody structure of a vehicle, the method comprising:

positioning at least one arcuate beam connected at one end to a front rail, the front rail being configured to take a crash load, forming a load path, the arcuate beam being angularly connected to one of a left rocker arm and a right rocker arm of the vehicle's underbody structure, wherein:

the angular connection of the arcuate beam is configured to transfer the crash load at least partially, during the frontal impact on the vehicle, to a respective one of the left rocker arm and the right rocker arm to which the arcuate beam is connected;

at least one first beam is disposed substantially along the length of the vehicle, and at least one second beam is disposed substantially along the width of the vehicle, wherein the arcuate beam is connected at one end to the front rail; the arcuate beam, the first beam, and the second beam are connected to form a loop structure, a first end of the first beam being directly connected to a first end of the second beam, a second end of the first beam being connected to the arcuate beam, and a second end of the second beam being directly connected to the arcuate beam, the loop structure including:

storage portions for components disposed within the underbody structure, wherein the beams oriented substantially along the length and the width of the vehicle are configured to provide attachment regions for mounting the components to the underbody structure.

14. The method of claim 13, wherein the components include at least one of a vehicular battery and a charger for the vehicular battery.

15. The method of claim 13, further comprising a back-up rail bracket connecting the front rail to the loop structure and forming a continuous load path.

16. The method of claim 13, wherein the loop structure is formed by hydroforming.

\* \* \* \* \*